United States Patent [19]

Kishimoto et al.

[11] 3,922,668
[45] Nov. 25, 1975

[54] LIQUID-CRYSTAL INDICATOR DRIVING SYSTEM

[75] Inventors: Juji Kishimoto, Tokyo; Hiroyuki Mikada, Kawasaki, both of Japan

[73] Assignee: Canon Kabushiki Kaisha, Japan

[22] Filed: June 5, 1974

[21] Appl. No.: 476,676

Related U.S. Application Data

[63] Continuation of Ser. No. 281,265, Aug. 16, 1972.

[52] U.S. Cl. ...... 340/336; 340/166 EL; 350/160 LC
[51] Int. Cl.² .......................................... G02F 1/18
[58] Field of Search ........ 350/160 LC; 340/166 EL, 340/324 R, 324 M, 336

[56] References Cited
UNITED STATES PATENTS

| 3,541,543 | 11/1970 | Crawford | 340/336 |
| 3,653,745 | 4/1972 | Mao | 350/160 LC |
| 3,654,606 | 4/1972 | Marlowe et al. | 340/324 M |

*Primary Examiner*—John W. Caldwell
*Assistant Examiner*—Marshail M. Curtis
*Attorney, Agent, or Firm*—Fitzpatrick, Cella, Harper & Scinto

[57] ABSTRACT

A liquid crystal indicator driving system comprises a liquid crystal indicator with opposed electrodes and a liquid crystal filling between the electrodes. A first voltage source is provided to apply a voltage of one polarity between the opposed electrodes, and a second voltage source is provided to apply a voltage of the other polarity between the opposed electrodes. Means is provided to drive the liquid crystal indicator from the first voltage source during at least the operation result indicating period in one operating cycle and to drive the liquid crystal indicator from the second voltage source except when the indicator is driven from the first voltage source. The two voltage sources may be replaced by a single voltage source, the voltage of which may be changed over a polarity by a switching circuit.

6 Claims, 7 Drawing Figures

LIQUID-CRYSTAL INDICATOR DRIVING SYSTEM

This is a continuation of application Ser. No. 281,265, filed Aug. 16, 1972.

BACKGROUND OF THE INVENTION

1. Field of the Invention

This invention relates to a liquid crystal indicator driving system for use with portable electronic computers.

2. Description of the Prior Art

The indicator widely known as liquid crystal indicator is such that liquid crystal material fills between opposed electrodes and a voltage is applied between these electrodes to thereby place the liquid crystal material in an electric field area and bring the molecules forming such liquid crystal material into a specific condition, thus accomplishing an indicating action. DC drive or pulse drive has often been employed to drive such indicator.

However, the life of liquid crystal is generally so closely correlated with the voltage and current applied thereto that the composition of liquid crystal will be fatally varied even by a voltage within the safe range for liquid crystal if such voltage is continuously applied for a long time without the polarity thereof being changed. For example, in an indicator device using a nematic liquid crystal material composed chiefly of anisylidene-p-aminophenylacetate (APAPA) and having a total thickness of 25 microns or so, application of a DC voltage continued for several hundred hours would result in creation of craters or turbidity which would make the liquid crystal difficult for further use. Thus, the life of the liquid crystal has been very much reduced.

SUMMARY OF THE INVENTION

It is therefore an object of the present invention to increase the life of a liquid crystal indicator by causing the polarity of the voltage for driving the indicator to be varied at least once during an operating cycle.

It is another object of the present invention to vary the polarity of the voltage for driving the liquid crystal indicator by alternately connecting parallel-connected voltage sources of the opposite polarities with the liquid crystal indicator.

It is still another object of the present invention to vary the polarity of the voltage for driving the liquid crystal indicator by providing a single voltage source with a switching circuit and controlling such switching circuit.

It is yet another object of the present invention to cause the drive voltage for driving the liquid crystal indicator with one polarity to be different from the drive voltage for driving the liquid crystal indicator with the other polarity.

BRIEF DESCRIPTION OF THE DRAWINGS

The invention will become fully apparent from the following detailed description of various embodiments thereof taken in conjunction with the accompanying drawings, in which.

Figure 1:
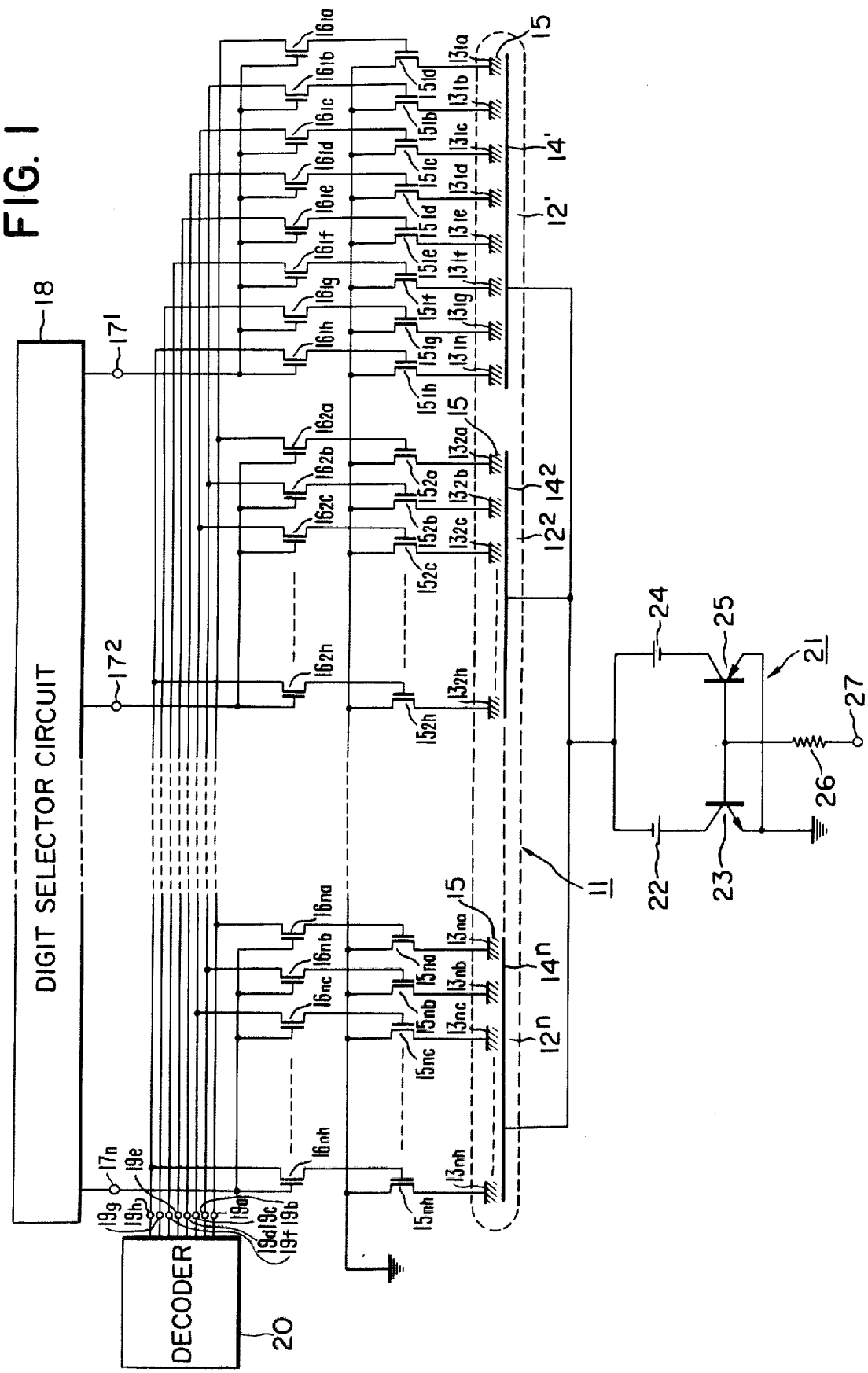
FIG. 1 is a circuit diagram showing the liquid crystal indicator driving system according to the present invention.

DESCRIPTION OF THE PREFERRED EMBODIMENTS:

Referring to FIG. 1, there is shown a circuit diagram illustrating an example of the liquid crystal indicator driving system according to the present invention as applied to the indicator device in a portable electronic computer. A liquid crystal indicator having a nematic liquid crystal is generally designated by 11 and includes $n$ indicator portions $12^1, 12^2, \ldots 12^n$ each of which is capable of indicating one-digit numeral or character. These indicator portions have their respective pattern electrodes $13^{1a}, 13^{1b}, \ldots 13^{1h}, 13^{2a}, 13^{2b}, \ldots 13^{2h}, \ldots 13^{na}, 13^{nb}, \ldots 13^{nh}$ for selecting patterns and common electrodes $14^1, 14^2, \ldots 14^n$ disposed in opposed relationship with the pattern electrodes associated with the same indicator portions. Liquid crystal 15 fills between the said two different types of electrodes, i.e. the pattern electrodes and the common electrodes, and a voltage may be applied between these two types of electrodes to thereby establish an electric field therebetween so that such field drives the liquid crystal to perform an indicating action.

Although FIG. 1 shows all the pattern electrodes only in the indicator portion $12^1$, it is to be understood that any other indicator portion similarly includes such pattern electrodes, which are omitted in the figure for the simplification of illustration.

Figure 2:
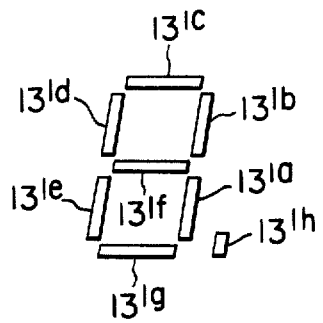
FIG. 2 illustrates the indication pattern of the liquid crystal indicator shown in FIG. 1.

FIG. 2 shows an example of the arrangement of the aforesaid patterns in a respective indicator portion (the reference characters in FIG. 2 designate the corresponding electrodes of the indicator portion $12^1$ in FIG. 1), and any desired numerical value may be indicated by suitably selecting the pattern electrodes so arranged. The pattern electrodes in the aforesaid indicator 11 are connected with the drain electrodes of first field effect transistors $15^{1a}, 15^{1b}, \ldots 15^{1h}, 15^{2a}, 15^{2b}, \ldots 15^{2h}, \ldots 15^{na}, 15^{nb}, \ldots 15^{nh}$. The source electrodes of the first field effect transistors are grounded in common. The drain electrodes of second field effect transistors $16^{1a}, 16^{1b}, \ldots 16^{1h}, 16^{2a}, 16^{2b}, \ldots 16^{2h}, \ldots 16^{na}, 16^{nb}, \ldots 16^{nh}$ are connected with the gate electrodes of the first field effect transistors, and those of the gate electrodes of the second field effect transistors which are associated with the same indicator portions are connected together to provide digit selector terminals $17^1, 17^2, \ldots 17^n$ for applying digit selecting signals. Such digit selector terminals are connected with a digit selector circuit 18. The source electrodes of the second field effect transistors which are associated with the same pattern electrodes of the distinct indicator portions are connected together to provide pattern selector terminals $19a, 19b, \ldots 19h$ for applying pattern signals. Such pattern selector terminals are connected with the decode output of a decoder 20 which decodes binary coded 4-bit signals from an indication register (not shown) and converts them into pattern signals.

The liquid crystal indicator shown in FIG. 1 is of the dynamically driven type wherein digit selecting signals from the digit selector circuit are successively applied to the digit selector terminals $17^1, 17^2, \ldots 17^n$ while binary coded signals from the indication register are decoded to provide pattern signals, which in turn are applied to the pattern selector terminals so that signals for driving the pattern electrodes are applied to the digits selected by the digit selecting signals. During a subsequent period, the application of the pattern signals to the pattern electrodes in such digits is terminated to drive the pattern electrodes for the digit of the next order. In this way, signals are applied to the respective digit selector terminals and to the pattern selector terminals.

On the other hand, the common electrodes $14^1, 14^2, \ldots 14^n$ forming the aforesaid indicator portions are connected with one another and with a change-over circuit 21. The change-over circuit 21 is grounded through a parallel circuit including a voltage source 22 of one polarity, an NPN transistor 23 having its emitter-collector path serially connected with the voltage source 22, a voltage source 24 opposite in polarity to the said voltage source 22, and a PNP transistor 25 having its emitter-collector path serially connected with the voltage source 24. The bases of the transistors 23 and 25 are connected with each other and further with a resistor 26 which in turn is connected with a signal applying terminal 27.

Figure 3:
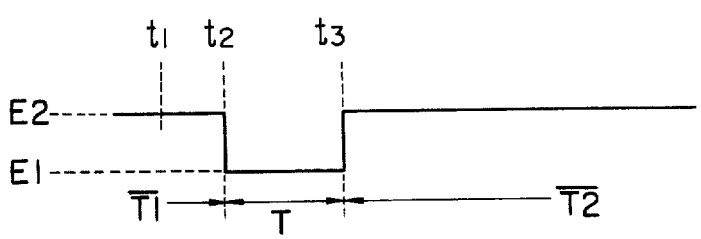
FIG. 3 shows the waveform of a change-over signal applied to a change-over circuit for changing over the polarity of the drive voltage for the liquid crystal indicator driving system shown in FIG. 1.

A signal S as shown in FIG. 3 may be applied to the terminal 27, whereby the voltage source for driving the liquid crystal may be changed over between the voltage source 22 and the voltage source 24 to thereby vary the polarity with which the liquid crystal indicator is driven.

The signal S is a signal for distinguishing between an operating period T in one operating cycle and the other period $\overline{T}$ (including a digit period $\overline{T1}$, an operation result $\overline{T2}$, etc.). It is assumed that the voltage at the level E1 is sufficient to turn on the transistor 25 and turn off the transistor 23 and that the voltage at the level E2 is sufficient to turn off the transistor 25 and turn on the transistor 23.

Figure 4:
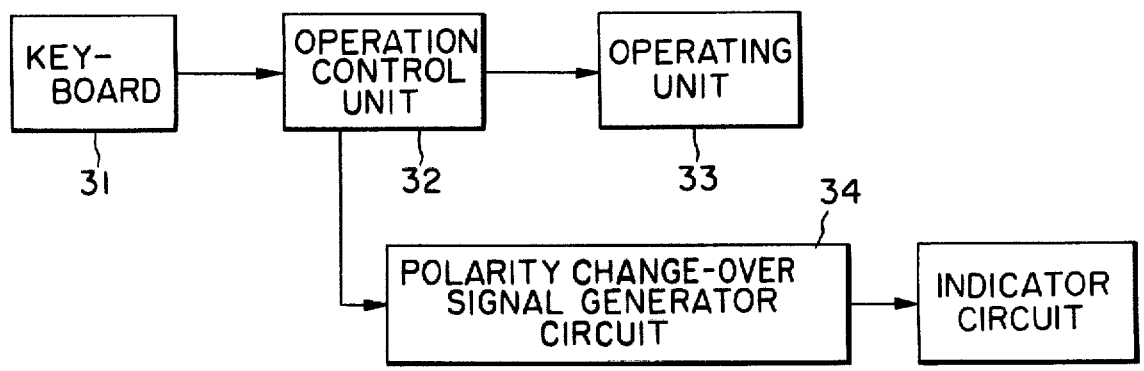
FIG. 4 is a block diagram showing the circuit for providing the change-over signal.

A circuit for providing such signal S is shown in the block diagram of FIG. 4, wherein key signals from a keyboard 31 are introduced to an operation control unit 32, the output of which is partly applied to an operating unit 33 to control the operation while the output of the control unit 32 is partly delivered to a polarity change-over signal generator circuit 34, which produces the aforesaid signal S. The output of the polarity change-over signal generator circuit 34 is applied to the change-over circuit 21. It is assumed here that a signal at a time $t_1$ during the digit period $\overline{T1}$ as shown in FIG. 3 is being applied to the terminal 27 and that a signal is being applied to the digit selector terminal $17^1$ and to the pattern selector terminal $19h$. Then, conduction will occur between the sources and drain electrodes of the field effect transistors $16^{1a} - 16^{1h}$ and the pattern selecting signal from the terminal $19h$ will be applied to the sources of the field effect transistors $16^{1h}, 16^{2h}, \ldots 16^{nh}$. Among these transistors, the transistor $16^{1h}$ alone has its source-drain path in conduction, and therefore, only one of the first field effect transistors, i.e. the one designated by $15^{1h}$, has a signal applied to its gate electrode, thus grounding the pattern electrode $13^{1h}$ alone.

On the other hand, it is assumed that the signal S is being applied, as mentioned, to the terminal 27 of the change-over circuit 21 connected with the common electrodes $12^1, 12^2, \ldots 12^n$ and that the time is at $t_1$. Then the transistor 23 will turn on and the transistor 25 will turn off.

Consequently, a voltage from the voltage source 22 is applied to the liquid crystal indicator and the common electrodes and the pattern electrodes are energized negatively and positively, respectively. Under such conditions, the field effect transistor $15^{1h}$ alone is in ON state as described above, with a result that the common electrode $14^1$ and the pattern electrode $13^{1h}$ are driven with the negative and positive polarities, respectively, thus providing a pattern indication.

Since the illustrated embodiment is of the dynamically driven type as mentioned previously, the indicator portion $12^1$ is driven for predetermined short time $\Delta t$ and thereafter stopped, whereupon the subsequent indicator portion is driven for a predetermined short time $\Delta t$. In this way, the successive indicator portions are sequentially driven until the indicator portion $12^n$ has been driven, whereafter the indicator portion $12^1$ is again selected. During all the while, a negative voltage is continuously applied to the common electrodes of the respective indicator portions.

The time during which each indicator portion is turned on will now be considered. Since a drive signal is applied to each indicator portion only for a short time $\Delta t$, the time during which each indicator portion forming each order is turned on should originally be $\Delta t$. In the present embodiment, however, a bit of information once applied may be stored for more than one sector period (in the case of 12 digits) owing to the storage effect between the gate and source of the first field effect transistors $15^{1a}, 15^{1b}, \ldots 15^{1h}, 15^{2a}, 15^{2b}, \ldots 15^{2h}, \ldots 15^{na}, 15^{nb}, \ldots 15^{nh}$.

For example, if a drive signal is applied to the transistor $15^{1h}$ for a certain digit period and thereafter the application of the drive signal to the transistor $15^{1h}$ is stopped during the subsequent digit period, this transistor will remain conductive owing to the storage effect between the gate and source thereof and accordingly, the voltage remains applied between the pattern electrode $13^{1h}$ and the common electrode $14^1$ to continue the indication. Such indication continues for more than one sector, i.e. until the drive signal has made one round to drive the transistor $15^{1h}$ again. In short, the indicator may remain driven not dynamically but statically even if a dynamic drive signal is applied thereto.

When a time $t_2$ is reached after such continued with a predetermined polarity, and the digit period is terminated and the operating period is entered. This varies the level of the signal T, and such variation switches the transistor 23 from its ON state to its OFF state and the transistor 25 from its OFF state to its ON state. As a result, the opposite voltage is applied to the first field effect transistors, and such application of the opposite polarity permits a current to flow from the source and drain to the substrate of the field effect transistors through the diode connection between the source and drain substrate thereof. Thus, the liquid crystal indicator is driven in the opposite direction to the direction in which it is driven during the digit period, and moreover, all of the field effect transistors $15^{1a}, 15^{1b}, \ldots 15^{1h}, 15^{2a}, 15^{2b}, \ldots 15^{2h}, \ldots 15^{na}, 15^{nb}, \ldots 15^{nh}$ are turned on, whereby all the electrodes in the liquid crystal indicator are driven. In this way, all the pattern electrodes are driven during the operating period T which is very short, and thus all the indicator portions of the liquid crystal indicator effect the indication in the pattern as shown in FIG. 2. However, such indication does not offer so much eyesore since the operating time T is very short, but if required, it is possible to reduce the absolute value of the voltage of the voltage source 24 below the absolute value of the voltage of the voltage source 22 so that the voltage applied to the electrodes of the liquid crystal indicator is reduced during the period of the indication effected by the opposite voltage. With such arrangement, the indication of the operation by the opposite voltage may be carried out at such a low efficiency that the indication during such period becomes much less conspicuous. After the operating time has terminated at time $t_3$ (i.e. the period for indicating the operation result), a change-over signal at the level E2 is again applied to drive the liquid crystal indicator in the same manner as at the time $t_1$.

Although the embodiment of FIG. 1 has been described as using two voltage sources 22 and 24, only a single voltage source may be used and the polarity of the voltage applied to the liquid crystal indicator may be varied.

Figure 7:
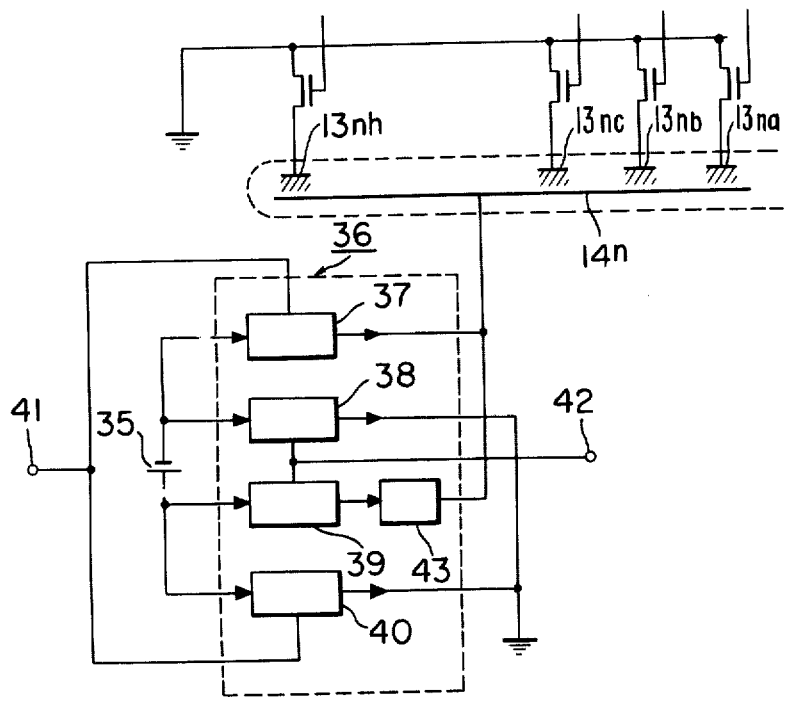
FIG. 7 is a block diagram showing another embodiment of the change-over circuit for changing over the polarity of the drive voltage for the liquid crystal indicator driving system.

Such an embodiment is shown in FIG. 7, although this figure only shows the portion corresponding to the change-over circuit 21 in FIG. 1, it being understood that the other portions including those portions designated by similar numerals are similar to the corresponding portions of FIG. 1. In FIG. 7, reference numerals 35 and 36 designate a voltage source and a switching circuit, respectively. The switching circuit comprises switching elements 37, 38, 39 and 40. One end of the switching element 37 is connected with the negative terminal of the voltage source 35 and the other end is connected with the pattern electrode side of the liquid crystal indicator. One end of the switching element 38 is connected with the negative terminal of the voltage source 35 and the other end is connected with the pattern electrode side of the liquid crystal indicator. One end of the switching element 39 is connected with the positive terminal of the voltage source 35 and the other end is connected with the common electrode side of the liquid crystal indicator. One end of the switching element 40 is connected with the positive terminal of the voltage source 35 and the other end is connected with the pattern electrode side of the liquid crystal indicator. A control terminal 41 is provided so that the switching elements 37, 40 may be turned on or off simultaneously, and another control terminal 42 is provided so that the switching elements 38, 39 may be turned on or off simultaneously. Signals may be applied to such terminal to thereby vary the polarity of the voltage applied to drive the liquid crystal indicator.

More specifically, a signal may be applied to the control terminal 41 to turn on the switching element 37 and 40 while a signal may be applied to the control terminal 42 to turn off the switching elements 38 and 39, thereby providing a positive potential to the pattern electrodes of the liquid crystal indicator and a negative potential to the common electrodes. Or conversely, a signal of the opposite polarity may be applied to the control terminal 41 to turn off the switching elements 37 and 40 while a signal of the opposite polarity may be applied to the control terminal 42 to turn on the switching elements 38 and 39, thereby providing a negative potential to the pattern electrodes of the liquid crystal indicator and a positive potential to the common electrodes. Further, by inserting a voltage changing member 43 serially with one of the switching elements (for example, switching element 39), the voltage as applied to the electrodes of the liquid crystal indicator through the voltage changing member 43 may be reduced to thereby reduce the indicating action of the liquid crystal indicator during the application of such reduced voltage.

Thus, the described arrangement permits the liquid crystal indicator to be driven at least once during a certain operating cycle (in case of the described embodiment, during the operating period) with the opposite polarity to that during the other periods, thus varying the polarity of the drive voltage. This is useful to greatly improve the life of the liquid crystal.

In the embodiments described above, the operating period is selected as the period during which the indicator is driven with the opposite polarity, whereas such selection of the period is not the only possible one but any other period than the operation result indicating period may be selected as the period for applying the opposite polarity and the length of such selected period need not be so great.

Figure 5:
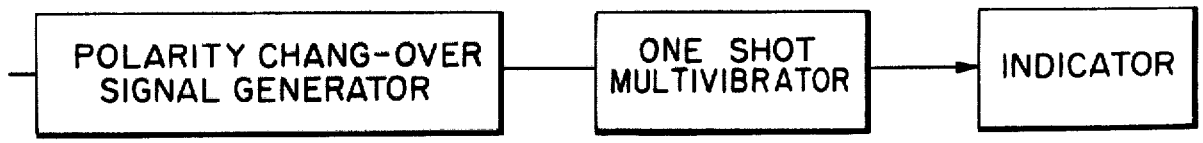
FIG. 5 is a block diagram showing the circuit for providing another type of change-over signal.
Figure 6:
FIG. 6 illustrates the waveform of the change-over signal provided by the circuit of FIG. 5.

FIG. 6 shows a signal waveform used when a very small part of the operating time is selected as the period for applying the voltage of the opposite polarity. As shown in FIG. 5, such a signal may readily be provided by inserting a one-shot multivibrator behind the operating time control unit shown in FIG. 4.

We claim:

1. In an electronic computer which includes signal entry means, means for executing an operation in response to a signal entry and means for controlling the operation of said executing means; the combination of
a liquid crystal indicator for displaying an information located in said computer, said liquid crystal indicator having at least one common electrode and a plurality of pattern electrodes opposed to said common electrode between which a liquid crystal material is interposed to carry out a displaying operation by applying a voltage between said common electrode and pattern electrodes;
means for selecting said pattern electrodes including independent switch elements each connected in circuit with a different one of said pattern electrodes to control the application of voltage across said common electrode and pattern electrodes in response to application of switching signals to said switch elements, said switch elements being arranged such that said switching signals are retained for a duration following application thereof whereby to maintain application of voltage across said electrodes; and a liquid crystal indicator driving system, comprising
means for applying a voltage of one polarity between said common electrode and the opposed pattern electrodes, which have been selected by said selecting means, while said computer is in a display indicating mode of its operation and for applying a voltage of a reverse polarity between said common electrode and the opposed pattern electrodes while said computer is in another mode of its operation.

2. In an electronic computer which includes signal entry means, means for executing an operation in response to a signal entry and means for controlling the operation of said executing means;

a liquid crystal indicator driving apparatus comprising the combination of:

a liquid crystal indicator comprising a plurality of indicating units for displaying plural digits of information located in said computer, each of said indicating units having one common electrode and a plurality of pattern electrodes opposed to said common electrode between which a liquid crystal material is interposed for displaying one digit of information;

a first junction for commonly connecting said common electrode of each of said indicating units;

a second junction for commonly connecting said pattern electrodes of each of said indicating units through first switching elements having respective control terminals for controlling a switching operation thereof;

a pattern selection means for selecting said pattern electrodes of each of said indicating units;

means for connecting to said pattern selection means said control terminals of said first switching elements, which are commonly connected with the corresponding pattern electrodes of said indicating units, through second switching elements having respective control terminals for controlling a switching operation thereof;

a digit selection means for selecting at least one digit to be indicated in said liquid crystal indicator;

means for connecting to said digit selection means said control terminals of said second switching elements which are connected to the respective control terminals of said first switching elements and which are commonly connected in each of said indicating units, said first and second switching elements being arranged such that signals applied to the control terminals of the first switching elements are maintained thereon for a duration following application of signals to the control terminals of their associated second switching elements; and means for applying a voltage of one polarity across said first and second junctions when said computer is in one mode of its operation and for applying a voltage of another polarity across said first and second junctions while said computer is in another mode of its operation.

3. A combination according to claim 2, wherein said voltage applying means comprises a voltage supply applying a voltage across said first and second junctions and means for reversing polarities of the voltage applied across said first and second junctions by said voltage supply in response to changes in the operational mode of said computer.

4. A combination according to claim 2, wherein said voltage applying means comprises a parallel circuit arranged between said first and second junctions, said parallel circuit in turn comprising a first voltage source, a first switch connected in series with said first voltage source, a second voltage source of reversed polarity with respect to said first voltage source and a second switch connected in series with said second voltage source; and means for establishing a voltage from said first voltage source across said parallel circuit by closing said first switch and opening said second switch while said computer is in one mode of its operation and for establishing a voltage of said second voltage source across said parallel circuit by opening said first switch and closing said second switch while said computer is in another mode of its operation.

5. A combination according to claim 4, wherein said first and second voltage sources have different absolute values of voltage.

6. A combination according to claim 3, wherein the voltage reversal means comprises a third switching element having a control terminal and disposed between one terminal of said voltage supply and said first junction;

a fourth switching element having a control terminal and disposed between said one terminal of said voltage supply and said second junction;

a fifth switching element having a control terminal and disposed between the other terminal of said voltage supply and said first junction;

a sixth switching element having a control terminal and disposed between the other terminal of said voltage supply and said second junction;

means for commonly connecting said control terminals of said third and sixth switching elements; and means for commonly connecting said control terminals of said fourth and fifth switching elements.

* * * * *